(12) United States Patent
Balster et al.

(10) Patent No.: US 8,170,333 B2
(45) Date of Patent: *May 1, 2012

(54) IMAGE PROCESSING SYSTEMS EMPLOYING IMAGE COMPRESSION

(75) Inventors: Eric Balster, Dayton, OH (US); Mike Flaherty, Kettering, OH (US); Benjamin Fortener, Centerville, OH (US); David Lucking, Kettering, OH (US); Thaddeus Marrara, Dayton, OH (US); David Mundy, Dayton, OH (US); Frank Scarpino, Centerville, OH (US); Ken Simone, Miamisburg, OH (US); William Turri, Beavercreek, OH (US); Nick Vicen, Oakwood, OH (US); David Walker, Dayton, OH (US)

(73) Assignee: University of Dayton, Dayton, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 13/272,622

(22) Filed: Oct. 13, 2011

(65) Prior Publication Data

US 2012/0033886 A1   Feb. 9, 2012

(51) Int. Cl.
 *G06K 9/00* (2006.01)
(52) U.S. Cl. ........................ 382/166; 382/173
(58) Field of Classification Search ................ 382/166, 382/173
See application file for complete search history.

(56) References Cited

U.S. PATENT DOCUMENTS

| 6,587,589 | B1 * | 7/2003 | Chen et al. ................ 382/240 |
| 7,545,988 | B2 | 6/2009 | Meeker |
| 7,889,791 | B2 * | 2/2011 | Taubman ............... 375/240.11 |
| 2006/0228031 | A1 | 10/2006 | Hou |
| 2008/0291996 | A1 * | 11/2008 | Pateux et al. ........... 375/240.11 |
| 2009/0116685 | A1 * | 5/2009 | Yoo et al. ................... 382/100 |
| 2010/0049778 | A1 | 2/2010 | Jachalsky et al. |

OTHER PUBLICATIONS

Balster, E. et al.; Fast PCRD-Opt Computation in JPEG2000; ICSES 2010—The International Conference on Signals and Electronic Systems; Gliwice, Poland; Sep. 7-10, 2010; pp. 431-434; Institute of Electronics, Silesian University of Technology.

Balster, E. et al.; Efficient Processing of JPEG2000 Imagery; Proceedings of the 4th International Symposium on Communications, Control and Signal Processing, ISCCSP; Limassol, Cyprus; Mar. 3-5, 2010; pp. 1-6.

Balster, E. et al.; Bypass and Parallel Modes for JPEG2000 Compression of Natural Imagery; Aerospace and Electronics Conference (NAECON), Proceedings of the IEEE 2010 National; Jul. 14-16, 2010; pp. 203-207; IEEE.

(Continued)

*Primary Examiner* — Vikkram Bali
(74) *Attorney, Agent, or Firm* — Dinsmore & Shohl LLP

(57) ABSTRACT

A system for processing an image includes a an image data input port, a compressed image data output port or a compressed image data storage node, a non-transitory memory component storing a set of executable instructions, and a scalable tile processing device. The executable instructions cause the system to receive image data, partition the image data into tiles, transmit a tile to the scalable tile processing device, receive an encoded bit stream corresponding to the transmitted tile from the tile processing device, and output compressed image data including the encoded bit stream. The scalable tile processing device receives the tile including tile image data, wavelet transforms, quantizes, segments, and encodes the tile image data to generate a plurality of encoded code blocks, and transmits an encoded bit stream including the plurality of encoded code blocks to the system.

17 Claims, 5 Drawing Sheets

OTHER PUBLICATIONS

Balster, E. et al.; Combined Spatial and Temporal Domain Wavelet Shrinkange Algorithm for Video Denoising; IEEE Transactions on Circuits and Systems for Video Technology; Feb. 2006; pp. 220-230; vol. 16, No. 2; IEEE.

Balster, E. et al.; Efficient processing of optimally truncated JPEG2000 imagery; Optical Engineering; Feb. 2010; pp. 027001-1-027001-10; vol. 49(2).

Balster, E. et al.; Integer-based, post-compression rate-distortion optimization computation in JPEG2000 compression; Optical Engineering; Jul. 2010; pp. 077005-1-077005-6; vol. 49(7).

Balster, E. et al.; Integer Computation of JPEG2000 Wavelet Transform and Quantization for Lossy Compression; Jul. 21, 2010; pp. 495-500; IEEE.

Chang, Y-W. et al.; Word-Level Parallel Architecture of JPEG 2000 Embedded Block Coding Decoder; IEEE Transactions on Multimedia; Oct. 2007; pp. 1103-1112; vol. 9, No. 6; IEEE.

Damecharla, H.; FPGA Implementation of a Parallel Ebcot Tier-1 Encoder That Preserves Encoding Efficiency; Thesis—The University of Akron; Aug. 2006; pp. 1-125.

Lai, Y-K. et al.; A High-Performance and Memory-Efficient VLSI Architecture with Parallel Scanning Method for 2-D Lifting-Based Discrete Wavelet Transform; IEEE Transactions on Consumer Electronics; May 2009; pp. 400-407; vol. 55, No. 2; IEEE.

Lepley, M.; JPEG 2000 and WSQ Image Compression Interoperability; MITRE Technical Report; Feb. 2001; pp. 1-52; The MITRE Corporation.

Liu, K. et al.; A Dual Symbol Arithmetic Coder Architecture With Reduced Memory for JPEG2000; Prceedings of 2010 IEEE 17th International Conference on Image Processing; Sep. 26-29, 2010; Hong Kong; pp. 513-516; IEEE.

Lucking, D.; FPGA Implementation of the JPEG2000 MQ Decoder; Thesis—University of Dayton; May 2010; pp. 1-85.

Mansouri, A. et al.; An Efficient VLSI Architecture and FPGA Implementation of High-Speed and Low Power 2-D DWT for (9, 7) Wavelet Filter; IJCSNS International Journal of Computer Science and Network Security; Mar. 2009; pp. 50-60; vol. 9, No. 3.

Moore, F. et al.; A Differential Evolution Algorithm for Optimizing Signal Compression and Reconstruction Transforms; Jul. 12-16, 2008; pp. 1907-1911; ACM.

Moore, F. et al.; Evolved Transforms for Image Reconstruction; Evolutionary Computation; Sep. 2-5, 2005; pp. 2310-2316; vol. 3; IEEE.

Shafer, J.; Embedded Vector Processor Architecture for Real-Time Wavelet Video Compression; May 2004; pp. 1-110; University of Dayton.

Sweldens, W.; The Lifting Scheme: A Construction of Second Generation Wavelets; Siam J. Math Anal.; Mar. 1998; pp. 511-546; vol. 29, No. 2; Society for Industrial and Applied Mathematics.

Wagh, K. et al.; Design & Implementation of JPEG2000 Encoder using VHDL; Proceedings of the World Congress on Engineering, London, U.K.; Jul. 2-4, 2008; pp. 670-675; vol. 1.

Walker, D. et al.; Planning for a Real-Time JPEG2000 Compression System; Aerospace and Electronics Conference; Jul. 16-18, 2008; pp. 234-238; IEEE.

Xing, Z. et al.; A Cycle-Efficient Sample-Parallel EBCOT Architecture for JPEG2000 Encoder; Proceedings of 2004 International Symposium on Intelligent Multimedia, Video and Speech Processing; Oct. 20-22, 2004; Hong Kong; pp. 386-389.

Image Compression: How Math Led to the JPEG2000 Standard; Why Do Math? website; pp. 1-2; http://www.whydomath.org/node/wavlets/jpeg2000quantization.html; Nov. 2, 2010.

Abu-Hajar, A. et al.; Integer-To-Integer Shape Adaptive Wavelet Transform for Region of Interest Image Coding; Oct. 2002; pp. 94-97; IEEE.

Adams, M. et al.: Low-Complexity Reversible Integer to-Integer Wavelet Transforms for Image Coding; Aug. 1999; pp. 1-4.

Adams, M. et al.; Wavelet Transforms in the JPEG-2000 Standard; Communications, Computers and signal Processing; Aug. 2001; pp. 160-163; IEEE.

Balster, E.; Video Compression and Rate Control Methods Based on the Wavelet Transform; Dissertation—Graduate School of The Ohio State University; May 2004, pp. 1-166.

Balster, E. at al.; Integer Computation of Lossy JPEG2000 Compression; Aug. 2011; pp. 2386-2391; IEEE.

Clunie, D.: Lossless Compression of Grayscale Medical Image—Effectiveness of Traditional and State of the Art Approaches; Feb. 2000; p. 1-11.

Gao, Z.; Image/Video Compression and Quality Assessment Based on Wavelet Transform; Dissertation—Graduate School of The Ohio State University, May 2007; pp. 1-130.

Leider. A, et al.; Path-based Encoding Efficiency of Wavelet-based Compressed Imagery; Dec. 2005 IEEE International Symposium on Signal Processing and Information Technology; pp. 197-201; IEEE.

Lu, Y. et al.; FPGA Design of Pipeline-Based MQ Coder; Chinese Journal of Electron Devices; Apr. 2004; pp. 1-2; Jan. 2007 Tsinghua Tongfang Knowledge Network Technology Co., Ltd., Beijing.

Pandey, S. et al.; Implementation of integer Wavelet Transform on Software Configurable Processor; Sep. 2006; pp. 1-4; IEEE.

Sheng, P. at al.; Lossy and Lossless Image Compression Using Reversible Integer Wavelet Transforms; IEEE; .. Oct. 1998; pp. 876-880.

Taubman, D. et al.; JPEG 2000 Image Comppression Fundamentals, Standards and Practice; Nov. 2001; p. 438; Kluwer Academic Publishers; Norwell, Massachusetts.

Tay, P. et al.; JPEG 2000 Scalar Quantization Using An Optimally Frequency Localized Modulated Lapped Transform, Sep. 2005, pp. 1-4; IEEE.

Xu, R. et al.; High-Dynamic-Range Still-Image Encoding in JPEG 2000; IEEE Computer Graphics and Applications; Nov. 2005; pp. 69-75; IEEE Computer Society.

JPEG2000 Wavelet Transform on StarCore-Based DSPs; Nov. 2004, pp. 1-44; Freescale Semiconductor, Inc.

Office Action dated Dec. 22, 2011 pertaining to U.S. Appl. No. 13/272,633, filed Oct. 13, 2011.

Office Action dated Dec. 21, 2011 pertaining to U.S. Appl. No. 13/272,628, filed Oct. 13, 2011.

* cited by examiner

IMAGE PROCESSING SYSTEMS EMPLOYING IMAGE COMPRESSION

CROSS-REFERENCE TO RELATED APPLICATIONS

This application is related to U.S. patent application Ser. No. 13/272,628, filed Oct. 13, 2011, and U.S. patent application Ser. No. 13/272,633, filed Oct. 13, 2011, but does not claim priority thereto.

BACKGROUND

1. Field

The present specification generally relates to image processing systems and, more particularly, to image processing systems employing wavelet transformation, quantization, and distortion estimation.

2. Technical Background

An image processing system may compress an image to form a compressed representation of the image and/or decompress a compressed representation of the image to reconstruct the image. It may be desirable for an image processing system, such as a large-scale surveillance image processing system to compress and/or decompress an image in real time. When algorithmically complex compression and/or decompression algorithms are utilized to compress and/or decompress large images in real time, it may be desirable for the image processing system to employ fast compression and/or decompression algorithms.

For example, an image processing system may employ JPEG 2000 compression and/or decompression. JPEG 2000 algorithms may result in enhanced compression efficiency compared to other compression algorithms. In order to achieve such enhanced compression efficiency, JPEG 2000 compression algorithms may be substantially more algorithmically complex than other image compression algorithms, such as JPEG compression algorithms. Similarly, JPEG 2000 decompression algorithms may be substantially more algorithmically complex than other image decompression algorithms, such as JPEG decompression algorithms.

A typical image compression algorithm may employ floating point-based wavelet transform, quantization, and encoding steps. The wavelet transform may use floating point computation to transform integer pixel values into floating point wavelet coefficients that represent the original image. The quantization step may use floating point computation to modify the floating point wavelet coefficients so that the modified wavelet coefficients represent the original image with the least amount of precision required to represent the image with a desired image quality after reconstruction. The encoding step is applied to represent the quantized wavelet coefficients in an efficient way in order to achieve further compression. As part of the encoding step, distortion estimates, which are used subsequently in the image compression algorithm, may be generated using floating point processing. Image compression algorithms that utilize such floating point computation during the wavelet transform, the quantization step, and distortion estimation may be computationally intensive and may extend the time required for image compression.

Accordingly, a need exists for alternative image processing systems.

SUMMARY

In one embodiment, a system for processing an image includes an image data input port, a compressed image data output port or a compressed image data storage node, a non-transitory memory component, and a scalable tile processing device. The non-transitory memory component stores a set of executable instructions that causes the system to receive image data at the image data input port and partition the image data into a plurality of tiles. Each tile includes tile image data. The executable instructions further cause the system to transmit a tile of the plurality of tiles to the scalable tile processing device, receive an encoded bit stream corresponding to the tile from the scalable tile processing device, and output compressed image data comprising the encoded bit stream to the compressed image data output port or the compressed image data storage node. The scalable tile processing device includes a plurality of logic blocks that cause the scalable tile processing device to receive the tile comprising tile image data from the system, wavelet transform the tile image data to generate a plurality of sub-band coefficients. Wavelet transforming the tile image data includes amplifying an input image data signal, splitting the amplified input image data signal into odd samples and even samples, processing the odd samples with a filter that at least multiplies the odd samples by a first integer lifting coefficient, processing the even samples with a filter that at least multiplies the even samples by a second integer lifting coefficient, scaling the processed odd samples, scaling the processed even samples, adding the even samples to the processed and scaled odd samples to generate a plurality of low frequency coefficients, and adding the odd samples to the processed and scaled even samples to generate a plurality of high frequency coefficients. The logic blocks further cause the scalable tile processing device to quantize the plurality of sub-band coefficients. Quantizing the plurality of sub-band coefficients includes multiplying each sub-band coefficient of the plurality of sub-band coefficients by an integer sub-band quantization weight and dividing each sub-band coefficient of the plurality of sub-band coefficients by an integer base quantization parameter. The logic blocks further cause the scalable tile processing device to segment the plurality of quantized sub-band coefficients into a plurality of code blocks and encode each code block of the plurality of code blocks to generate a plurality of encoded code blocks. Encoding each code block includes calculating an individual bit distortion associated with truncating a bit by performing a binary logic operation, at least one bit shift, and at least one subtraction. The logic blocks further cause the scalable tile processing device to transmit the encoded bit stream comprising the plurality of encoded code blocks to the system.

In another embodiment, a system for processing an image includes a computing device that includes an image data input port, a compressed image data output port or a compressed image data storage node, and a non-transitory memory component that stores a set of executable instructions that causes the computing device to receive image data at the image data input port. The executable instructions further cause the computing device to partition the image data into a plurality of tiles. Each tile includes tile image data. The executable instructions further cause the computing device to wavelet transform the tile image data to generate a plurality of sub-band coefficients. Wavelet transforming the tile image data includes amplifying an input image data signal, splitting the amplified input image data signal into odd samples and even samples, processing the odd samples with a filter that at least multiplies the odd samples by a first integer lifting coefficient, processing the even samples with a filter that at least multiplies the even samples by a second integer lifting coefficient, scaling the processed odd samples, scaling the processed even samples, adding the even samples to the processed and scaled odd samples to generate a plurality of low frequency coefficients, and adding the odd samples to the processed and scaled even samples to generate a plurality of high frequency coefficients. The executable instructions further cause the computing device to quantize the plurality of sub-band coefficients. Quantizing the plurality of sub-band coefficients includes multiplying each sub-band coefficient of the plurality of sub-band coefficients by an integer sub-band quantization weight and dividing each sub-band coefficient of the plurality of sub-band coefficients by an integer base quantization parameter. The executable instructions further cause the computing device to segment the plurality of quantized sub-band coefficients into a plurality of code blocks and encode each code block of the plurality of code blocks to generate a plurality of encoded code blocks. Encoding each code block includes calculating an individual bit distortion associated with truncating a bit by performing a binary logic operation, at least one bit shift, and at least one subtraction. The executable instructions further cause the computing device to output compressed image data comprising the plurality of encoded code blocks to the compressed image data output port or the compressed image data storage node.

In yet another embodiment, a system for processing an image includes a computing device that includes an image data input port, a compressed image data output port or a compressed image data storage node, and a non-transitory memory component that stores a set of executable instructions that causes the computing device to receive image data at the image data input port. The executable instructions further cause the computing device to partition the image data into a plurality of tiles. Each tile includes tile image data. The executable instructions further cause the computing device to wavelet transform the tile image data to generate a plurality of sub-band coefficients. Wavelet transforming the tile image data includes amplifying an input image data signal by multiplying the input signal by $2^\delta$, splitting the amplified input image data signal into odd samples and even samples, processing the odd samples with a filter that at least multiplies the odd samples by a first integer lifting coefficient, processing the even samples with a filter that at least multiplies the even samples by a second integer lifting coefficient, scaling the processed odd samples by dividing the processed odd samples by $2^\circ$, scaling the processed even samples by dividing the processed even samples by $2^\circ$, adding the even samples to the processed and scaled odd samples to generate a plurality of low frequency coefficients, and adding the odd samples to the processed and scaled even samples to generate a plurality of high frequency coefficients. The first integer lifting coefficient is calculated by multiplying a floating point lifting coefficient by $2^\circ$ and rounding the product down to the nearest integer. The second integer lifting coefficient is calculated by multiplying a second floating point lifting coefficient by $2^\circ$ and rounding the product down to the nearest integer. The executable instructions further cause the computing device to quantize the plurality of sub-band coefficients. Quantizing the plurality of sub-band coefficients includes multiplying each sub-band coefficient of the plurality of sub-band coefficients by an integer sub-band quantization weight, and dividing each sub-band coefficient of the plurality of sub-band coefficients by an integer base quantization parameter. The integer sub-band quantization weight is calculated by multiplying a floating point sub-band quantization weight by $2^\lambda$ and rounding the product down to the nearest integer. The integer base quantization parameter is calculated by multiplying a base quantization parameter by $2^{\lambda+\delta}$ and rounding the product down to the nearest integer. The executable instructions further cause the computing device to segment the plurality of quantized sub-band coefficients into a plurality of code blocks and encode each code block of the plurality of code blocks to generate a plurality of encoded code blocks. Encoding each code block includes calculating an individual bit distortion associated with truncating a bit by performing a binary logic operation, at least one bit shift, and at least one subtraction. The executable instructions further cause the computing device to output compressed image data comprising the plurality of encoded code blocks to a compressed image data output port or a compressed image data storage node.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Referring generally to the figures, embodiments described herein are directed to image processing systems employing image compression. More specifically, the embodiments described herein may provide a system for processing an image that includes a data input port, a compressed image data output port or a compressed image data storage node, a non-transitory memory component storing a set of executable instructions, and a scalable tile processing device. The executable instructions cause the system to receive image data, partition the image data into tiles, transmit a tile to the scalable tile processing device, receive an encoded bit stream corresponding to the transmitted tile from the tile processing device, and output compressed image data including the encoded bit stream. The scalable tile processing device receives the tile including tile image data, wavelet transforms, quantizes, segments, and encodes the tile image data to generate a plurality of encoded code blocks, and transmits an encoded bit stream including the plurality of encoded code blocks to the system. Various embodiments of image processing systems are described in detail below.

Throughout the description, the variables δ, λ, and σ are used to describe and explain the mathematical operations performed during the various imaging processing steps employed by image processing systems as described herein. The variables δ, λ, and σ may be integers.

Figure 1:
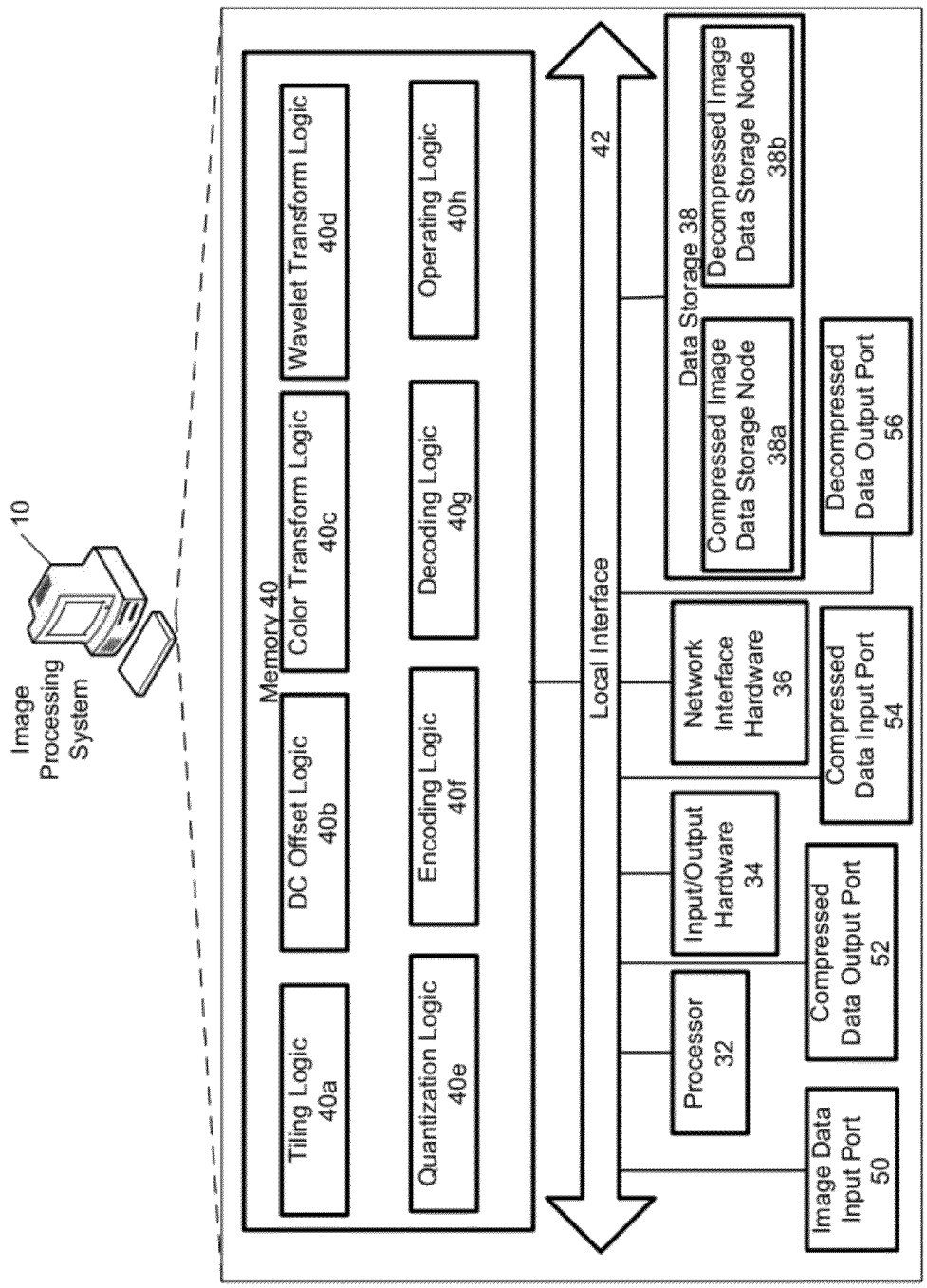
FIG. 1 depicts a schematic illustration of an image processing system, illustrating hardware and software that may be utilized in performing compression and/or decompression, according to one or more embodiments described and illustrated herein.

FIG. 1 depicts an exemplary embodiment of an image processing system 10. While in some embodiments, the image processing system 10 may be configured as a general purpose computer with the requisite hardware, software, and/or firmware, in some embodiments, the image processing system 10 may be configured as a special purpose computer designed specifically for performing the functionality described herein.

The image processing system 10 may include a processor 32, a data storage component 38, a non-transitory memory component 40, an image data input port 50, a compressed image data output port 52, a compressed image data input port 54, a decompressed image data output port 56. While the embodiment of FIG. 1 is illustrated as comprising an image data input port 50, a compressed image data output port 52, a compressed image data input port 54, a decompressed image data output port 56, other embodiments may not contain all of these ports. The data storage component 38 may comprise a compressed image data storage node 38a and a decompressed image data storage node 38b. While the embodiment depicted in FIG. 1 is illustrated as comprising a compressed image data storage node 38a and a decompressed image data storage node 38b, other embodiments may lack either or both of these storage nodes.

The non-transitory memory component 40 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the non-transitory memory component 40 may be configured to store tiling logic 40a, DC offset logic 40b, color transform logic 40c, wavelet transform logic 40d, quantization logic 40e, encoding logic 40f, decoding logic 40g, and operating logic 40h (each of which may be embodied as computer readable program code, firmware, or hardware, as an example). A local interface 42 is also included in FIG. 1 and may be implemented as a bus or other interface to facilitate communication among the components of the image processing system 10.

The processor 32 may include any processing component configured to receive and execute computer readable code instructions (such as from the data storage component 38 and/or non-transitory memory component 40).

It should be understood that the data storage component 38 may reside local to and/or remote from the image processing system 10, and may be configured to store one or more pieces of data for access by the image processing system 10 and/or other components.

Included in the non-transitory memory component 40 may be the tiling logic 40a, DC offset logic 40b, color transform logic 40c, wavelet transform logic 40d, quantization logic 40e, encoding logic 40f, decoding logic 40g, and operating logic 40h.

The image processing system 10 may receive image data from the image data input port 50 or from the data storage component 38. The DC offset logic 40b may be configured to cause the image processing system 10 to add an offset to the plurality of pixel values of each tile so that the plurality of pixel values have a symmetric dynamic range centered about zero. Such an offset is typically added to images in which the pixel values are represented by unsigned integers. For example, a pixel value represented by B bits may be offset by subtracting $2^{B-1}$ from the pixel value. While the image processing system 10 depicted in FIG. 1 comprises DC offset logic 40b, other image processing systems lack DC offset logic 40b. For example, image processing systems do not typically add an offset to the pixel values when the pixel values are not unsigned integers.

The color transform logic 40c may be configured to cause the image processing system 10 to color transform each pixel value of a tile to be represented by a luminance component, a blue-difference chrominance component, and a red-difference chrominance component. While the image processing system 10 depicted in FIG. 1 comprises color transform logic 40c, other image processing systems lack color transform logic 40c. In particular, image processing systems that do not process color images do not typically color transform the pixel values of the image.

The tiling logic 40a may be configured to cause the image processing system 10 to partition an image, which may include a matrix of pixel values, into a plurality of non-overlapping tiles. Each of the plurality of tiles may correspond to a rectangular region of the image. Each tile may comprise a plurality of rows of pixel values and a plurality of columns of pixel values, forming a matrix of pixel values. After partitioning the image into a plurality of tiles, the image processing system 10 may process each tile in parallel, which may speed up the processing of the entire image. While the image processing system 10 depicted in FIG. 1 comprises tiling logic 40a, other image processing systems lack tiling logic 40a. While some embodiments may tile an image after any DC offset of the pixel values of the image or any color transformation of the pixel values of the image, other embodiments may tile the image before any DC offset or color transformation is applied to the image. For example, some image processing systems may not partition the image into tiles, instead processing the entire image as one tile.

The wavelet transform logic 40d may be configured to cause the image processing system 10 to decompose each tile into a plurality of decomposition levels. Each decomposition level may comprise a plurality of sub-bands, each of which may represent at least a portion of the image content of the original tile. In one embodiment, each composition level comprises 4 sub-bands: the HH sub-band, the HL sub-band, the LH sub-band, and the LL sub-band. The wavelet transform logic 40d may be configured to generate a plurality of sub-band coefficients for each sub-band in each decomposition level.

The sub-band coefficients for each of the 4 sub-bands may be generated in a two-step process by first performing a wavelet transform of the tile in a horizontal direction to generate a plurality of intermediate relatively low frequency coefficients (corresponding to the low frequency output of this wavelet transform) and a plurality of intermediate relatively high frequency coefficients (corresponding to the high frequency output of this wavelet transform). Next, a wavelet transform of the plurality of intermediate relatively low frequency coefficients is performed in a vertical direction to generate the plurality of LL sub-band coefficients (corresponding to the low frequency output of this wavelet transform) and the plurality of LH sub-band coefficients (corresponding to the high frequency output of this wavelet transform). Then, a wavelet transform of the plurality of intermediate relatively high frequency coefficients is performed in a vertical direction to generate the plurality of HL sub-band coefficients (corresponding to the low frequency output of this wavelet transform) and the plurality of HH sub-band coefficients (corresponding to the high frequency output of this wavelet transform). In some embodiments, the wavelet transform of the tile in the vertical direction may be pipelined with the wavelet transform of the tile in the horizontal direction such that at least one of the plurality of LL sub-band coefficients or at least one of the plurality of LH sub-band coefficients is generated before all of the intermediate relatively low frequency coefficients are generated. Alternatively, at least one of the plurality of HL sub-band coefficients or at least one of the plurality of HH sub-band coefficients is generated before all of the intermediate relatively high frequency coefficients are generated.

In an image processing system 10 that decomposes an image into more than one decomposition level, the sub-band coefficients for level n+1 are generated by performing the above 2-step wavelet transform on the LL sub-band coefficients of level n. For example, level 2 LL sub-band coefficients, level 2 LH sub-band coefficients, level 2 HL sub-band coefficients, and level 2 HH sub-band coefficients may be generated from the level 1 LL sub-band coefficients by performing the above 2-step wavelet transform of the level 1 LL sub-band coefficients. In some embodiments, a 2-step wavelet transform of the LL sub-band coefficients of level n may be performed to generate the LL, LH, HL, and HH sub-band coefficients of level n+1 before the wavelet transform of the LH, HL, and HH sub-band coefficients of level n has completed.

The wavelet transform mentioned above transforms an input signal into an output of high frequency coefficients and an output of low frequency coefficients. The input signal is first amplified by multiplying the input signal by a gain factor. In some embodiments, the gain factor may be $2^\delta$. In some embodiments, $\delta$ may be greater than 4. In some embodiments, $\delta$ may be 5. The amplified input signal is split into amplified odd samples and amplified even samples are then filtered in one or more lifting steps. Each lifting step comprises an odd sample filtering step and an even sample filtering step. Each odd sample filtering step processes an odd sample filtering step input signal with a filter that, among other things, multiplies the odd sample filtering step input signal by an integer lifting coefficient to generate an odd sample filter output signal. Each even sample filtering step processes an even sample filtering step input signal with a filter that, among other things, multiplies the even sample filtering step input signal by an integer lifting coefficient to generate an even sample filter output signal. The even sample filter output signal is then divided by a scaling factor to generate an even sample filtering step output signal. The integer lifting coefficient may be generated by scaling a floating point scaling coefficient. Scaling the floating point scaling coefficient may comprise multiplying the floating point scaling coefficient by $2^\sigma$, where $\sigma$ is an integer exponent of the floating point scaling coefficient, and rounding the product to the nearest integer. The odd sample filter output signal is then divided by a scaling factor to generate an odd sample filtering step output signal.

The low frequency coefficients that are output by the wavelet transform are generated by adding the amplified even samples to the sum of the odd sample filtering step output signals. The high frequency coefficients that are output by the wavelet transform are generated by adding the amplified odd samples to the sum of the even sample filtering step output signals.

Figure 2:
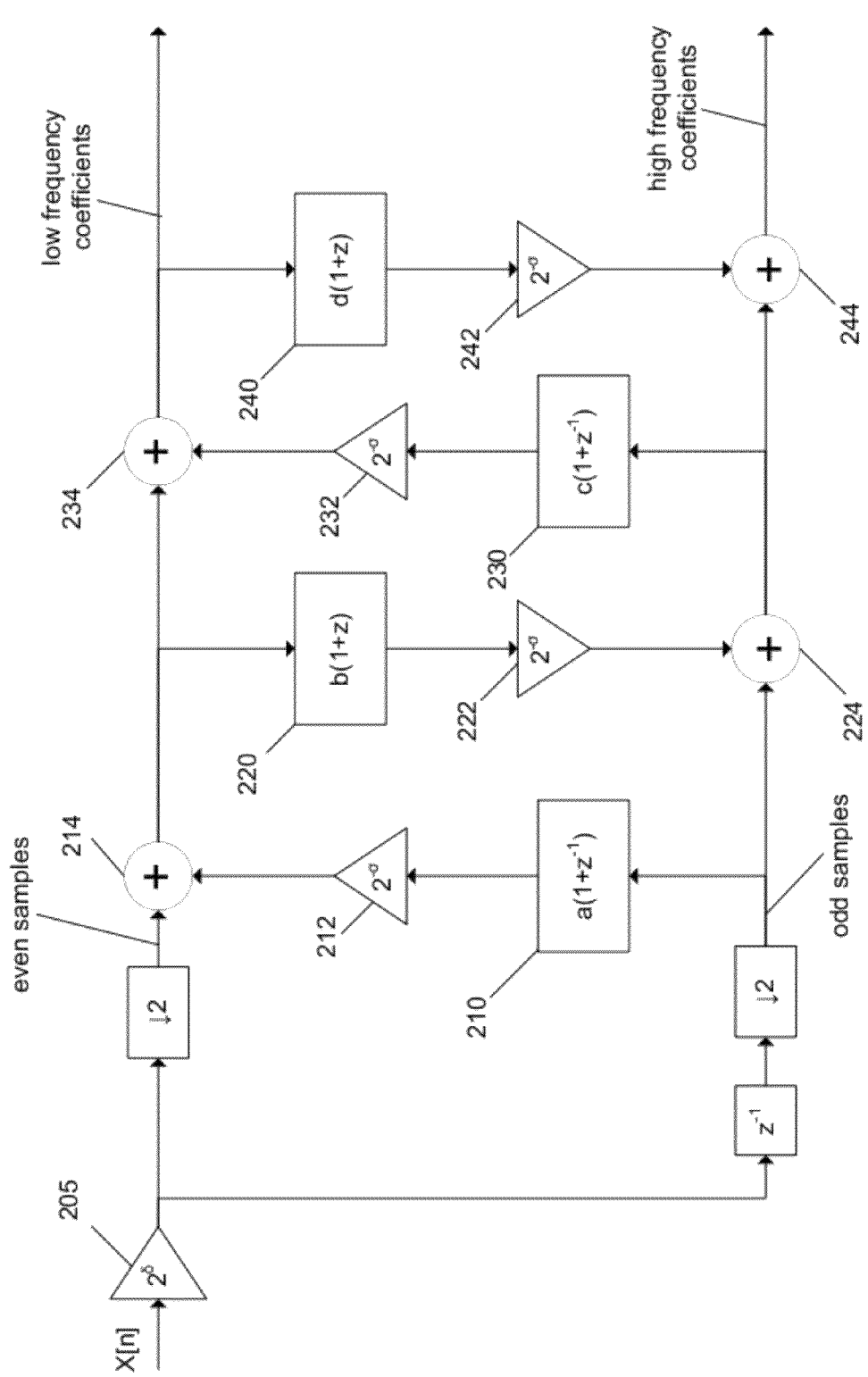
FIG. 2 depicts a schematic illustration of a wavelet transform, according to one or more embodiments described and illustrated herein.

Referring to FIG. 2, which illustrates a wavelet transform according to one embodiment, an input signal x[n] is amplified at block 205 by multiplying the input signal by $2^\delta$, where $\delta$ is an integer. The amplified input signal is then split into amplified odd samples and amplified even samples. The amplified odd samples are filtered by a filter defined by the transfer function of block 210, generating a first odd sample filter output. The filter defined by the transfer function of block 210, among other things, multiplies the input of the filter by a first integer lifting coefficient a. The first integer lifting coefficient a may be generated by scaling a first floating point scaling coefficient A. Scaling the first floating point scaling coefficient A may comprise multiplying A by $2^\sigma$, where $\sigma$ is an integer, and rounding the product to the nearest integer. The first odd sample filter output is then divided by $2^\sigma$ at block 212, producing a first odd sample filtering step output signal. The first odd sample filtering step output signal is then added to the even samples at adder 214.

Still referring to FIG. 2, the output of adder 214 is then filtered by a filter defined by the transfer function of block 220, generating a first even sample filter output. The filter defined by the transfer function of block 220, among other things, multiplies the input of the filter by a second integer lifting coefficient b. The second integer lifting coefficient b may be generated by scaling a second floating point scaling coefficient B. Scaling the second floating point scaling coefficient B may comprise multiplying B by $2^\sigma$ and rounding the product to the nearest integer. The first even sample filter output is then divided by $2^\sigma$ at block 222, producing a first even sample filtering step output signal. The first even sample filtering step output signal is then added to the odd samples at adder 224.

Still referring to FIG. 2, the output of adder 224 is then filtered by a filter defined by the transfer function of block 230, generating a second odd sample filter output. The filter defined by the transfer function of block 230, among other things, multiplies the input of the filter by a third integer lifting coefficient c. The third integer lifting coefficient c may be generated by scaling a third floating point scaling coefficient C. Scaling the third floating point scaling coefficient C may comprise multiplying C by $2^\sigma$ and rounding the product to the nearest integer. The second odd sample filter output is then divided by $2^\sigma$ at block 232, generating a second odd sample filtering step output signal. The second odd sample filtering step output signal is then added to the first even sample filtering step output signal at adder 234. The output of adder 234 comprises the low frequency coefficients of the exemplary wavelet transform.

Still referring to FIG. 2, the output of adder 234 is then filtered by a filter defined by the transfer function of block 240, generating a second even sample filter output. The filter defined by the transfer function of block 240, among other things, multiplies the input of the filter by a fourth integer lifting coefficient d. The fourth integer lifting coefficient d may be generated by scaling a fourth floating point scaling coefficient D. Scaling the fourth floating point scaling coefficient D may comprise multiplying D by $2^\sigma$ and rounding the product to the nearest integer. The second even sample filter output is then divided by $2^\sigma$ at block 242, generating a second even sample filtering step output signal. The second even sample filtering step output signal is then added to the first odd sample filtering step output signal at adder 244. The output of adder 244 comprises the high frequency coefficients of the exemplary wavelet transform.

In one embodiment, the wavelet transform may be a one-dimensional lifting implementation of the CDF 9/7 wavelet transform that utilizes integer lifting coefficients.

Referring once again to FIG. 1, the quantization logic 40e may be configured to cause the image processing system 10 to quantize the sub-band coefficients so that the quantized sub-band coefficients represent the original image with the least amount of precision required to represent the image so that the image can be reconstructed with a desired image quality. A sub-band coefficient may be quantized according to the following equation:

$$q_i[n] = \text{sign}(x_i[n]) \left\lfloor \frac{x_i[n] \lfloor 2^\lambda W_i \rfloor}{\lfloor 2^\lambda \Delta \rfloor} \right\rfloor$$

As shown in the equation above, quantizing a sub-band coefficient of sub-band i may comprise multiplying the sub-band coefficient by an integer sub-band quantization weight, the integer sub-band quantization weight being calculated by multiplying $2^\lambda$ by $W_i$ and then rounding the product down to the nearest integer, where $\lambda$ is a scaling factor and $W_i$ is a floating point sub-band quantization weight associated with sub-band i. Quantizing the sub-band coefficient of sub-band i, may further comprise dividing the product of the sub-band coefficient and the integer sub-band quantization weight by an integer base quantization parameter, the integer base quantization parameter being calculated by multiplying a base quantization parameter $\Delta$ by $2^\lambda$ and then rounding the product down to the nearest integer, where $\lambda$ is a scaling factor. In another embodiment, quantizing the sub-band coefficient of sub-band i may further comprise dividing the product of the sub-band coefficient and the integer sub-band quantization weight by an integer base quantization parameter, the integer base quantization parameter being calculated by multiplying a base quantization parameter $\Delta$ by $2^{\lambda+\delta}$ and then rounding the product down to the nearest integer, where $\lambda$ is a first scaling factor and $\delta$ is a second scaling factor.

After the sub-band coefficients have been quantized, the sub-band coefficients of each sub-band are segmented into a plurality of independent code blocks, each code block comprising a subset of all of the sub-band coefficients associated with a particular sub-band. The size of each code block may vary. For example, a code block may comprise 4×4 quantized sub-band coefficients, 16×16 quantized sub-band coefficients, or 32×32 quantized sub-band coefficients. In other embodiments, the code block size may vary. Each code block may then be independently encoded by encoding logic 40f to generate an embedded bit stream associated with each code block. Processing the code blocks independently may permit parallel processing of the code blocks. In some embodiments, the sub-band coefficients associated with each code block may be copied into sequential memory before they are encoded by encoding logic 40f to generate a plurality of encoded code blocks.

Referring to FIG. 1, the encoding logic 40f may be configured to encode each code block to generate an embedded bit stream associated with representing the encoded code block. In one embodiment, the encoding logic 40f may utilize the framework of the JPEG 2000 Tier I Encoder to encode the code block by performing a context formation task and an arithmetic encoder task. The context formation task typically comprises processing each code block with three bit-level coding passes. The three bit-level coding passes are typically the significance propagation pass, the magnitude refinement pass, and the clean up pass. Each coding pass typically operates on a neighborhood of spatially related bits. A code pass may modify neighborhood data, which may be stored for use by subsequent code passes. During each coding pass, neighborhood data and previously processed neighborhood data may be utilized to generate the context of the coding pass. In one embodiment, neighborhood data may be stored in a short delay queue and previously processed neighborhood data may be stored in a long delay queue. In an embodiment that performs encoding using an FPGA or other hardware, the short delay queue and the long delay queue may each comprise a FIFO block ram ("BRAM") device that accepts inputs, holds them in order, and releases them after a specific number of read cycles. Each coding pass generates a stream of symbols and corresponding contexts.

Referring to FIG. 1, the encoding logic 40f may be further configured to calculate a distortion estimate associated with truncating a bit of a sub-band coefficient in the $p^{th}$ bit plane and the $i^{th}$ sub-band. If the bit is not the most significant bit of the sub-band coefficient, the distortion estimate may be calculated by subtracting the square of the error associated with keeping the bit from the square of the error associated with removing the bit. The error associated with keeping the bit may be calculated by performing a bitwise logical AND operation of the sub-band coefficient with $2^{p-1}$. The error associated with removing the bit may be calculated by performing a logical AND operation of the sub-band coefficient with $2^p$. In an FPGA implementation, the error associated with keeping the bit and the error associated with removing the bit are necessarily powers of 2 and can be calculated with bit shifts.

The stream of symbols and corresponding contexts generated by the coding passes are typically input into the arithmetic encoder task, which generates an embedded bit stream for each code block. In an FPGA implementation of the arithmetic encoder, at least some of the math functions and equivalence checking functions may be partitioned into leaf level hardware processing objects, which may enable concurrent processing of functions.

After the embedded bit stream associated with each code block is generated, the distortion estimates generated during the encoding passes may be utilized to truncate the code blocks. After any truncation, the embedded (and optionally truncated) bit streams associated with the code blocks may be group and organized into compressed image data. The compressed image data may be output to a compressed image data output port 52. Alternatively, the compressed image data may be output to a compressed image data storage node 38a.

The image processing system 10 may receive compressed image data at the compressed image data input port 54. Alternatively, the image processing system 10 may receive compressed image data stored in the compressed image data storage node 38a.

The image processing system 10 may parse the compressed data into code blocks of encoded sub-band coefficients. In one embodiment, the decoding logic 40g may utilize the framework of the JPEG 2000 Tier I Decoder to decode the encoded code blocks. Decoding each code block of encoded sub-band coefficients may comprise processing the code block of encoded sub-band coefficients in multiple bit-level decoding passes, typically the clean up pass, the significance propagation pass, and the magnitude refinement pass. The decoding passes use context and encoded bit information from a memory controller to create contexts to pass to an arithmetic decoder, which generates decoded bits. The arithmetic decoder may receive a context value from the decoding pass. Based at least in part on the context value received from the decoding passes, the arithmetic decoder may also generate a probability estimate. After generating the probability estimate, the arithmetic decoder may directly an output bit from the context value and the probability estimate in one clock cycle.

Figure 3:
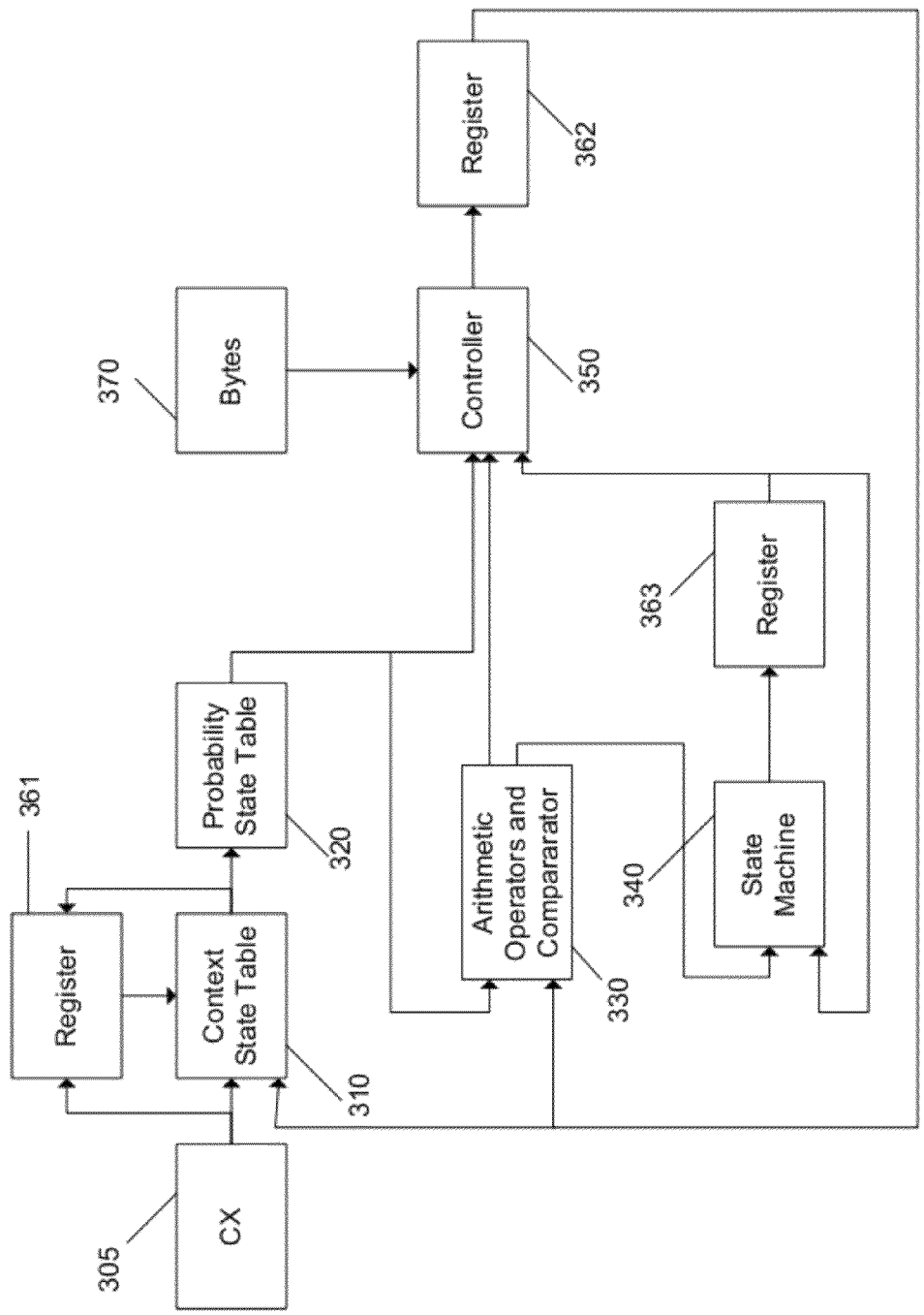
FIG. 3 depicts a schematic illustration of a block diagram of an arithmetic decoder, according to one or more embodiments described and illustrated herein.

Referring to FIG. 3, which schematically depicts a block diagram of one embodiment of an arithmetic decoder, the arithmetic decoder may comprise a context state table 310, a probability state table 320, an arithmetic operators and comparator module 330, a state machine 340, a controller 350, and a plurality of registers 361, 362, 363, 364. The arithmetic decoder may receive a context at block 305. Based on the received context, the context state table 310 and the probability state table 320 may output a probability estimate. The arithmetic operators and comparator module 330 performs arithmetic operations and logical operations in parallel using values from the internal registers 362 and the probability estimate output by the probability state table 320. The output of the arithmetic operators and comparator module 330 is used by the controller 350 to determine the output values to be stored in internal registers 362. The output of the arithmetic operators and comparator module 330 is also used by the state machine 340 to determine the next state. The output bit may be directly generated from the context value and the probability estimate in one clock cycle.

Figure 4:
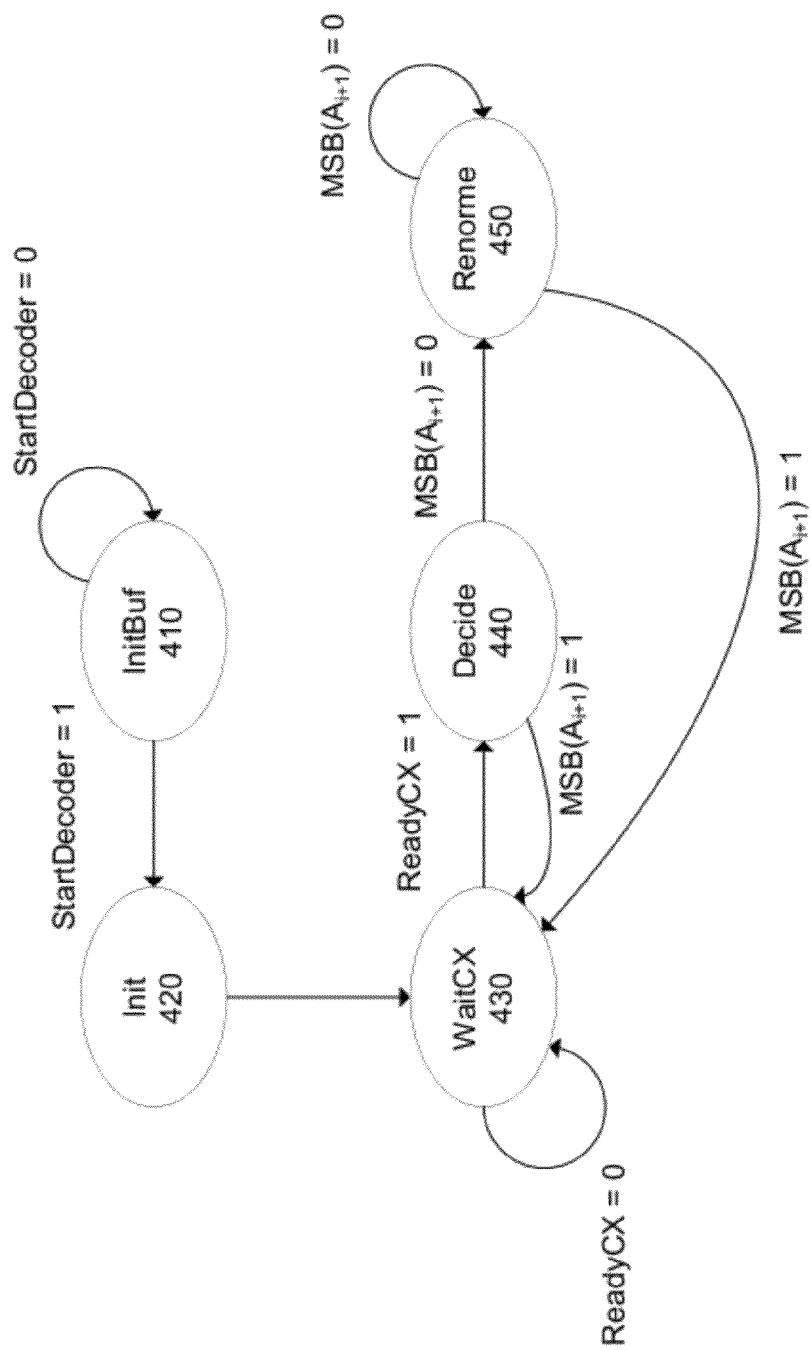
FIG. 4 depicts a schematic illustration of a state diagram implemented by a state machine of the arithmetic decoder of FIG. 3.

Referring to FIG. 4, which schematically illustrates a state diagram implemented by the state machine 340 of FIG. 3, the state machine comprises an InitBuf state 410, an Init state 420, a WaitCX state 430, a Decide state 440, and a Renorme state 450. The InitBuf state 410 and the Init state 420 load two bytes to be decoded into internal registers. The WaitCX state 430 produces probability estimations after the context is received from a decoding pass. The decide state 440 calculates the correct output bit and determines the values for the context state table 310, the probability state table 320, and the internal registers. If required, the renorme state 450 shifts the internal registers until the original value is reached and loads a byte if the register is empty.

The decoded bits generated by the arithmetic decoder may be returned to the decoding passes, which require the decoded bit in order to continue. In some embodiments, a first instance of a decoding pass will assume that an output bit of the arithmetic decoder is a first value, e.g. 1 and a second, parallel, instance of a decoding pass will assume that an output bit of the arithmetic decoder is a second value, e.g. 0. The decoded bits are returned to the memory controller and organized into decoded sub-band coefficient code blocks.

Referring again to FIG. 1, after the plurality of decoded code blocks comprising decoded sub-band coefficients are produced by the decoding logic 40g, the plurality of decoded code blocks may be de-quantized, and processed with an inverse wavelet transform, an inverse color transform (if the original image was color transformed during compressing), an inverse DC offset (if the original image was subjected to a DC offset during compression), and tiles may be combined by a tile combiner to form a decompressed image comprising decompressed image data.

The image processing system 10 may output decompressed image data to a decompressed image data output port 56. Alternatively, the decompressed image data may be output to a decompressed image data storage node 38b.

The operating logic 40h may include an operating system and/or other software for managing components of the image processing system 10.

The image processing system 10 may optionally include input/output hardware 34 and/or network interface hardware 36. The optional input/output hardware may include a graphics display device, keyboard: mouse, printer, camera, microphone, speaker, touch-screen, and/or other device for receiving, sending, and/or presenting data. The optional network interface hardware may include any wired or wireless networking hardware, such as a modem, LAN port, wireless fidelity (Wi-Fi) card, WiMax card, mobile communications hardware, and/or other hardware for communicating with other networks and/or devices.

It should now be understood that the components illustrated in FIG. 1 are merely exemplary and are not intended to limit the scope of this disclosure. More specifically, while the components in FIG. 1 are illustrated as residing within the image processing system 10, this is a nonlimiting example. In some embodiments, one or more of the components may reside external to the image processing system 10. Further, it should be understood that while the wavelet transform logic 40d, the quantization logic 40e, the encoding logic 40f, and the decoding logic 40g have been described as part of the non-transitory memory component 40 of the image processing system 10, each of these logic blocks may be implemented as one or more logic blocks in a field programmable gate array (FPGA) that operates with a hardware description language (e.g., VHDL, Verilog, etc.), an application specific integrated circuit (ASIC), a digital signal processor (DSP), or any other combination of hardware and/or software.

Figure 5:
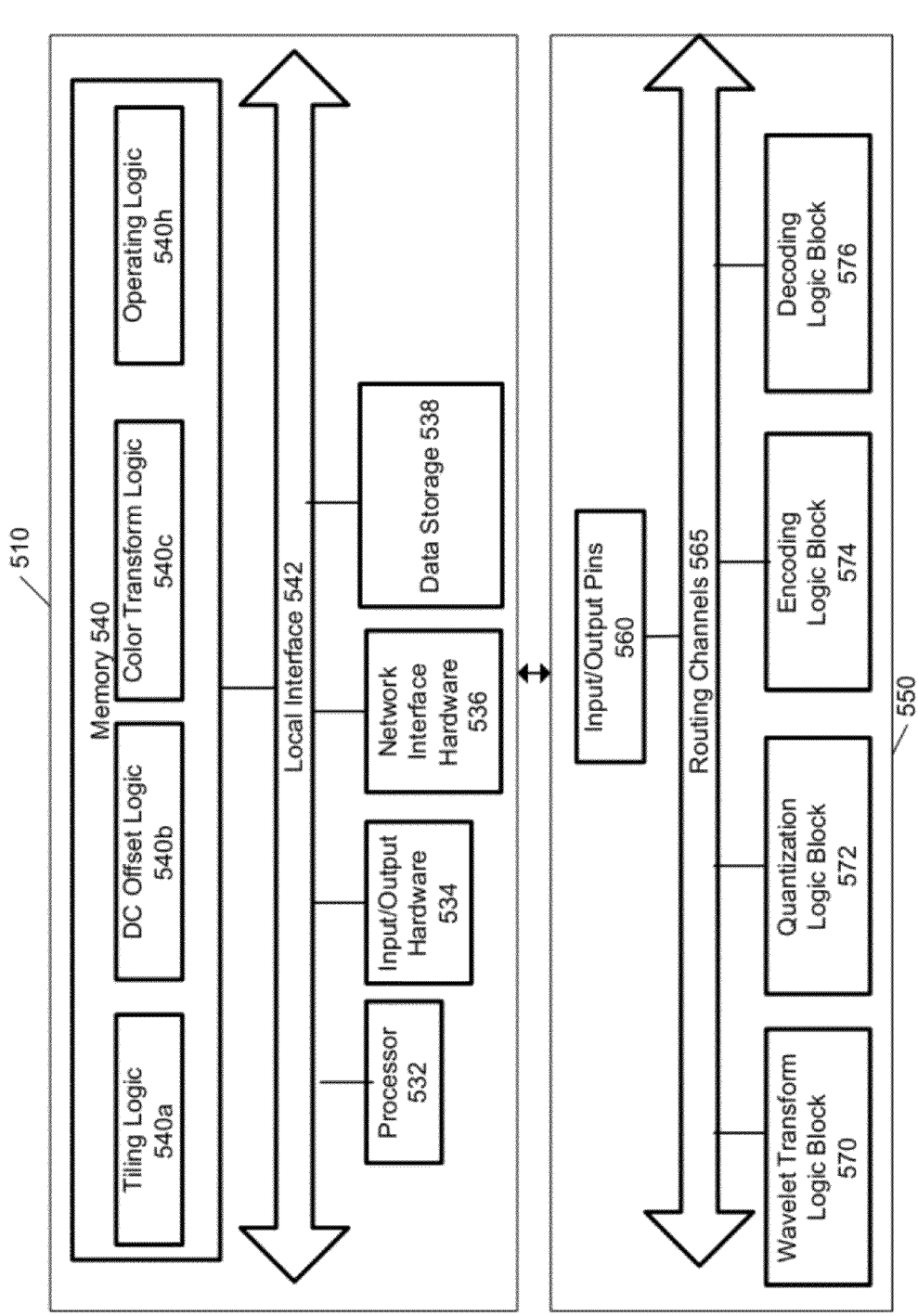
FIG. 5 depicts a schematic illustration of an image processing system comprising a computing device and a field programmable gate array, illustrating hardware and software that may be utilized in performing image compression and/or decompression, according to one or more embodiments described and illustrated herein.

For example, FIG. 5 depicts a schematic illustration of an image processing system 500 that comprises a computing device 510 and a field programmable gate array 550. The computing device 510 may include a processor 532, input/output hardware 534, network interface hardware 536, a data storage component 538, a non-transitory memory component 540, and a local interface 542. The field programmable gate array 550 may comprise input/output pins 560, routing channels 565, a wavelet transform logic block 570, a quantization logic block 572, an encoding logic block 574, and a decoding logic block 576.

Referring to the computing device 510 depicted in FIG. 5, the local interface 542 may be implemented as a bus or other interface to facilitate communication among the components of the computing device 510. Input/output hardware 534 may comprise an image data input port, a compressed image data output port, a compressed image data input port, and/or a decompressed image data output port. The network interface hardware 536 may include any wired or wireless networking hardware, such as a modem, LAN port, wireless fidelity (Wi-Fi) card, WiMax card, mobile communications hardware, and/or other hardware for communicating with other networks and/or devices.

The data storage component 538 may comprise a compressed image data storage node and a decompressed image data storage node. It should be understood that the data storage component 538 may reside local to and/or remote from the computing device 510, and may be configured to store one or more pieces of data for access by the computing device 510 and/or other components.

The non-transitory memory component 540 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the non-transitory memory component 540 may be configured to store tiling logic 540a, DC offset logic 540b, color transform logic 540c, and operating logic 540h (each of which may be embodied as computer readable program code, firmware, or hardware, as an example). The tiling logic 540a may be configured to cause the computing device 510 to partition an image, which may include a matrix of pixel values, into a plurality of non-overlapping tiles in a manner similar to the tiling logic 40a described in reference to FIG. 1 above. Similarly, the DC offset logic 540b may be configured to cause the computing device 510 to add an offset to the plurality of pixel values of each tile so that the plurality of pixel values have a symmetric dynamic range centered about zero in a manner similar to the DC offset logic 40b described in reference to FIG. 1 above. The color transform logic 540c may be configured to cause the computing device 510 to color transform each pixel value of a tile to be represented by a luminance component, a blue-difference chrominance component, and a red-difference chrominance component, in a manner similar to the color transform logic 40c described in reference to FIG. 1 above. The operating logic 540h may include an operating system and/or other software for managing components of the computing device 510.

The processor 532 may include any processing component configured to receive and execute computer readable code instructions (such as from the data storage component 538 and/or non-transitory memory component 540).

Included in the non-transitory memory component 540 may be the tiling logic 540a, DC offset logic 540b, color transform logic 540c, and operating logic 540h.

Referring to the field programmable gate array 550 of FIG. 5, the input/output pins 560 may allow the field programmable gate array 550 to send and receive data from the computing device 510. The routing channels 565 may be implemented as a bus or other interface to facilitate communication among the components of the field programmable gate array 550. The wavelet transform logic block 570 may be configured to operate in a manner similar to the wavelet transform logic 40d described in reference to FIG. 1 above. The quantization logic block 572 may be configured to operate in a manner similar to the quantization logic 40e described in reference to FIG. 1 above. The encoding logic block 574 may be configured to operate in a manner similar to the encoding logic 40f described in reference to FIG. 1 above. The decoding logic block 576 may be configured to operate in a manner similar to the decoding logic 40g described in reference to FIG. 1 above.

In operating, the computing device 510 may receive image data from an image data input port via input/output hardware 534 or from data storage component 538. The tiling logic 540a may cause the computing device 510 to partition the image, which may include a matrix of pixel values, into a plurality of non-overlapping tiles. If applicable, the optional DC offset logic 540b may cause the computing device 510 to add an offset to the plurality of pixel values. If applicable, the optional color transform logic 540c may cause the computing device 510 to optionally color transform each pixel value of a tile to be represented by a luminance component, a blue-difference chrominance component, and a red-difference chrominance component.

After tiling, the computing device 510 may transmit an image tile to the field programmable gate array 550 via input/output hardware 534. The field programmable gate array 550 may receive the image tile via input/output pins 560. The wavelet transform logic block 570 may cause the field programmable gate array 550 to wavelet transform the image tile data to generate a plurality of sub-band coefficients. The quantization logic block 572 may cause the field programmable gate array 550 to quantize the plurality of sub-band coefficients. The field programmable gate array 550 may also segment the plurality of quantized sub-band coefficients into a plurality of code blocks. Each code block may be encoded in parallel by an encoding logic block 574, which generates an encoded code block associated with each code block. The encoding logic block 574 may cause the field programmable gate array to generate an encoded bit stream associated with the code block. The encoded bit stream may include the plurality of encoded code blocks. The field programmable gate array 550 may store each bit stream in an output buffer and then transmit the encoded bit stream to the computing device 510 for further processing. In other embodiments, the field programmable gate array 550 may further process the encoded bit stream before transmitting to the computing device 510.

The computing device 510 may receive the encoded bit stream transmitted by the field programmable gate array 550. The computing device 510 may output compressed image data comprising the received encoded bit stream to the compressed image data output port or the compressed image data storage node of the computing device 510. In one embodiment, the computing device 510 receives the compressed image data at the compressed data input port, decodes the compressed image data to generate a plurality of decoded code blocks, and outputs decompressed image data comprising the plurality of decoded code blocks to the decompressed image data output port of the decompressed image data storage node of the computing device 510.

In other embodiments, the computing device 510 may transmit compressed image data to be decoded to the field programmable gate array 550 via input/output hardware 534. The field programmable gate array 550 may receive an image tile via input/output pins 560. The decoding logic block 576 may cause the field programmable gate array 550 to decode the image data and send at least partially decompressed image data back to the computing device 510.

While the image processing system 500 depicted in FIG. 5 comprises a field programmable gate array 550, in other embodiments, the image processing system 500 may include a different scalable tile processing device, such as, an application specific integrated circuit (ASIC), a digital signal processor (DSP), or any other combination of hardware and/or software.

It should be understood that an image processing system as shown and described herein may be implemented as a software-only system or as a hardware-accelerated system. For example, in one embodiment, the image processing system is implemented entirely in software that executes on one or more computing devices. In another embodiment, part of the image processing system is implemented in software and part of the image processing system is implemented in hardware. For example, in a hardware-accelerated image processing, an image may be received and partitioned into tiles in software, while the tiles may be wavelet transformed, quantized, and encoded in hardware. A hardware-accelerated image processing system may utilize a scalable client/server architecture, in which a server arbitrates all hardware resources, requiring the clients to communicate with the server in order to access hardware. This scalable architecture may allow each client to process an image in parallel, with each client communicating with the server via pipes.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for processing an image, the system comprising an image data input port, a compressed image data output port or a compressed image data storage node, a non-transitory memory component, and a scalable tile processing device, wherein:

the non-transitory memory component stores a set of executable instructions that causes the system to:

receive image data at the image data input port;
partition the image data into a plurality of tiles, each tile comprising tile image data;
transmit a tile of the plurality of tiles to the scalable tile processing device;
receive an encoded bit stream corresponding to the tile from the scalable tile processing device; and
output compressed image data comprising the encoded bit stream to the compressed image data output port or the compressed image data storage node; and the scalable tile processing device comprises a plurality of logic blocks that cause the scalable tile processing device to:
receive the tile comprising tile image data from the system;
wavelet transform the tile image data to generate a plurality of sub-band coefficients, wherein wavelet transforming the tile image data comprises amplifying an input image data signal, splitting the amplified input image data signal into odd samples and even samples, processing the odd samples with a filter that at least multiplies the odd samples by a first integer lifting coefficient, processing the even samples with a filter that at least multiplies the even samples by a second integer lifting coefficient, scaling the processed odd samples, scaling the processed even samples, adding the even samples to the processed and scaled odd samples to generate a plurality of low frequency coefficients, and adding the odd samples to the processed and scaled even samples to generate a plurality of high frequency coefficients;
quantize the plurality of sub-band coefficients, wherein quantizing the plurality of sub-band coefficients comprises multiplying each sub-band coefficient of the plurality of sub-band coefficients by an integer sub-band quantization weight and dividing each sub-band coefficient of the plurality of sub-band coefficients by an integer base quantization parameter;
segment the plurality of quantized sub-band coefficients into a plurality of code blocks;
encode each code block of the plurality of code blocks to generate a plurality of encoded code blocks, wherein encoding each code block comprises calculating an individual bit distortion associated with truncating a bit by performing a binary logic operation, at least one bit shift, and at least one subtraction; and
transmit the encoded bit stream comprising the plurality of encoded code blocks to the system.

2. The system of claim 1 further comprising a compressed image data input port and a decompressed image data output port or a decompressed image data storage node, wherein the executable instructions further cause the system to:
receive the compressed image data at the compressed image data input port;
decode the compressed image data to generate a plurality of decoded code blocks, wherein decoding the compressed image data comprises receiving a context value, generating a probability estimate, and directly generating an output bit from the context value and the probability estimate in one clock cycle; and
output decompressed image data comprising the plurality of decoded code blocks to the decompressed image data output port or the decompressed image data storage node.

3. The system of claim 2, wherein decoding the compressed image data further comprises:
processing a bit of the compressed image data in a first decoding pass that assumes that an output bit of a decoder is a first value; and
processing the bit in a parallel second decoding pass that assumes that the output bit of the decoder is a second value.

4. The system of claim 1, wherein the executable instructions further cause the system to copy the plurality of sub-band coefficients to sequential memory before encoding the plurality of sub-band coefficients.

5. The system of claim 1, wherein wavelet transforming the tile image data further comprises:
generating a plurality of intermediate relatively low frequency coefficients and a plurality of intermediate relatively high frequency coefficients;
generating a plurality of LL sub-band coefficients and a plurality of LH sub-band coefficients based on the plurality of intermediate relatively low frequency coefficients; and
generating a plurality of HL sub-band coefficients and a plurality of HH sub-band coefficients based on the plurality of intermediate relatively high frequency coefficients.

6. The system of claim 5, wherein:
at least one of the plurality of LL sub-band coefficients or at least one of the plurality of LH sub-band coefficients is generated before every intermediate relatively low frequency coefficient is generated; or
at least one of the plurality of HL sub-band coefficients or at least one of the plurality of HH sub-band coefficients is generated before every intermediate relatively high frequency coefficient is generated.

7. The system of claim 1, wherein:
the integer sub-band quantization weight is calculated by multiplying a floating point sub-band quantization weight by $2^\lambda$ and rounding the product down to the nearest integer; and
the integer base quantization parameter is calculated by multiplying a base quantization parameter by $2^\lambda$ and rounding the product down to the nearest integer.

8. The system of claim 1, wherein:
the integer sub-band quantization weight is calculated by multiplying a floating point sub-band quantization weight by $2^\lambda$ and rounding the product down to the nearest integer; and
the integer base quantization parameter is calculated by multiplying a base quantization parameter by $2^{\lambda+\delta}$ and rounding the product down to the nearest integer.

9. The system of claim 1, wherein:
the first integer lifting coefficient is calculated by multiplying a floating point lifting coefficient by $2^o$ and rounding the product down to the nearest integer;
the second integer lifting coefficient is calculated by multiplying a second floating point lifting coefficient by $2^o$ and rounding the product down to the nearest integer;
scaling the processed odd samples comprises dividing the processed odd samples by $2^o$; and
scaling the processed even samples comprises dividing the processed even samples by $2^o$.

10. The system of claim 1, wherein amplifying the input signal comprises multiplying the input signal by $2^\delta$.

11. The system of claim 1, wherein the non-transitory memory component that stores the set of executable instructions further causes the system to add an offset to the image data prior to the wavelet transform of the image data so that the image data has a symmetric dynamic range centered about zero, if the image data comprise unsigned integers.

12. The system of claim 1, wherein the non-transitory memory component that stores the set of executable instructions further causes the system to color transform the image data prior to the wavelet transform of the image data so that the image data corresponds to a luminance component, a blue-difference chrominance component, and a red-difference chrominance component.

13. The system of claim 1, wherein the binary logic operation is a bitwise AND operation.

14. The system of claim 1, wherein the scalable tile processing device is a field programmable gate array.

15. The system of claim 14, wherein encoding each code block of the plurality of code blocks further comprises:
processing the code block in a plurality of coding passes, wherein each coding pass generates a context value and a sample bit value; and
encoding the sample bit value based on the context value to produce compressed code block data, wherein all math functions and other equivalence checking functions performed during encoding are partitioned into leaf level hardware processing objects.

16. A system for processing an image, the system comprising a computing device that comprises an image data input port, a compressed image data output port or a compressed image data storage node, and a non-transitory memory component that stores a set of executable instructions that causes the computing device to:
receive image data at the image data input port;
partition the image data into a plurality of tiles, each tile comprising tile image data;
wavelet transform the tile image data to generate a plurality of sub-band coefficients, wherein wavelet transforming the tile image data comprises amplifying an input image data signal, splitting the amplified input image data signal into odd samples and even samples, processing the odd samples with a filter that at least multiplies the odd samples by a first integer lifting coefficient, processing the even samples with a filter that at least multiplies the even samples by a second integer lifting coefficient, scaling the processed odd samples, scaling the processed even samples, adding the even samples to the processed and scaled odd samples to generate a plurality of low frequency coefficients, and adding the odd samples to the processed and scaled even samples to generate a plurality of high frequency coefficients;
quantize the plurality of sub-band coefficients, wherein quantizing the plurality of sub-band coefficients comprises multiplying each sub-band coefficient of the plurality of sub-band coefficients by an integer sub-band quantization weight and dividing each sub-band coefficient of the plurality of sub-band coefficients by an integer base quantization parameter;
segment the plurality of quantized sub-band coefficients into a plurality of code blocks;
encode each code block of the plurality of code blocks to generate a plurality of encoded code blocks, wherein encoding each code block comprises calculating an individual bit distortion associated with truncating a bit by performing a binary logic operation, at least one bit shift, and at least one subtraction; and
output compressed image data comprising the plurality of encoded code blocks to the compressed image data output port or the compressed image data storage node.

17. A system for processing an image, the system comprising a computing device that comprises an image data input port, a compressed image data output port or a compressed image data storage node, and a non-transitory memory component that stores a set of executable instructions that causes the computing device to:
receive image data at the image data input port;
partition the image data into a plurality of tiles, each tile comprising tile image data;
wavelet transform the tile image data to generate a plurality of sub-band coefficients, wherein wavelet transforming the tile image data comprises amplifying an input image data signal by multiplying the input signal by $2^\delta$, splitting the amplified input image data signal into odd samples and even samples, processing the odd samples with a filter that at least multiplies the odd samples by a first integer lifting coefficient, wherein the first integer lifting coefficient is calculated by multiplying a floating point lifting coefficient by $2^o$ and rounding the product down to the nearest integer, processing the even samples with a filter that at least multiplies the even samples by a second integer lifting coefficient, wherein the second integer lifting coefficient is calculated by multiplying a second floating point lifting coefficient by $2^o$ and rounding the product down to the nearest integer, scaling the processed odd samples by dividing the processed odd samples by $2^o$, scaling the processed even samples by dividing the processed even samples by $2^o$, adding the even samples to the processed and scaled odd samples to generate a plurality of low frequency coefficients, and adding the odd samples to the processed and scaled even samples to generate a plurality of high frequency coefficients;
quantize the plurality of sub-band coefficients, wherein quantizing the plurality of sub-band coefficients comprises multiplying each sub-band coefficient of the plurality of sub-band coefficients by an integer sub-band quantization weight, wherein the integer sub-band quantization weight is calculated by multiplying a floating point sub-band quantization weight by $2^\lambda$ and rounding the product down to the nearest integer, and dividing each sub-band coefficient of the plurality of sub-band coefficients by an integer base quantization parameter, wherein the integer base quantization parameter is calculated by multiplying a base quantization parameter by $2^{\lambda+\delta}$ and rounding the product down to the nearest integer;
segment the plurality of quantized sub-band coefficients into a plurality of code blocks;
encode each code block of the plurality of code blocks to generate a plurality of encoded code blocks, wherein encoding each code block comprises calculating an individual bit distortion associated with truncating a bit by performing a binary logic operation, at least one bit shift, and at least one subtraction; and
output compressed image data comprising the plurality of encoded code blocks to a compressed image data output port or a compressed image data storage node.

* * * * *